(12) United States Patent
Weksler et al.

(10) Patent No.: US 11,209,902 B2
(45) Date of Patent: Dec. 28, 2021

(54) CONTROLLING INPUT FOCUS BASED ON EYE GAZE

(71) Applicant: LENOVO (Singapore) PTE. LTD., New Tech Park (SG)

(72) Inventors: Arnold S. Weksler, Raleigh, NC (US); John Carl Mese, Cary, NC (US); Nathan J. Peterson, Oxford, NC (US); Russell Speight VanBlon, Raleigh, NC (US); Mark Patrick Delaney, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 21 days.

(21) Appl. No.: 16/738,373

(22) Filed: Jan. 9, 2020

(65) Prior Publication Data
US 2021/0216138 A1 Jul. 15, 2021

(51) Int. Cl.
*G06F 3/0481* (2013.01)
*G06F 3/01* (2006.01)
*G06F 3/0489* (2013.01)

(52) U.S. Cl.
CPC .......... *G06F 3/013* (2013.01); *G06F 3/0481* (2013.01); *G06F 3/0489* (2013.01)

(58) Field of Classification Search
CPC ... G06F 3/0481; G06F 21/564; G06F 3/04886
See application file for complete search history.

(56) References Cited

U.S. PATENT DOCUMENTS

| | | | | |
|---|---|---|---|---|
| 2002/0089547 | A1* | 7/2002 | Huapaya | G06F 3/0481 715/802 |
| 2004/0189712 | A1* | 9/2004 | Rundell | G06F 9/451 715/808 |
| 2005/0052434 | A1* | 3/2005 | Kolmykov-Zotov | G06F 3/0488 345/179 |
| 2007/0040813 | A1* | 2/2007 | Kushler | G06F 3/04883 345/173 |
| 2015/0003819 | A1* | 1/2015 | Ackerman | H04N 5/23219 396/51 |
| 2015/0293592 | A1* | 10/2015 | Cheong | G06F 3/0416 345/173 |
| 2016/0187976 | A1* | 6/2016 | Levesque | G06Q 30/0241 705/14.4 |
| 2017/0277360 | A1* | 9/2017 | Breedvelt-Schouten | G06F 3/0481 |
| 2018/0129262 | A1* | 5/2018 | Veiga | G06F 1/1681 |
| 2018/0150204 | A1* | 5/2018 | Macgillivray | G06F 3/04842 |

* cited by examiner

*Primary Examiner* — Rayeez R Chowdhury
(74) *Attorney, Agent, or Firm* — Kunzler Bean & Adamson

(57) ABSTRACT

Apparatuses, methods, systems, and program products are disclosed for controlling input focus based on eye gaze. An apparatus includes a processor and a memory that stores code executable by the processor. The code is executable by the processor to determine a location of a user's eye gaze on the display device. The code is executable by the processor to determine an application window presented on the display device that corresponds to the determined location of the user's eye gaze. The code is executable by the processor to ignore input in response to the determined application window that corresponds to the location of the user's eye gaze not having focus.

20 Claims, 5 Drawing Sheets

CONTROLLING INPUT FOCUS BASED ON EYE GAZE

FIELD

The subject matter disclosed herein relates to computer input and more particularly relates to controlling input focus based on eye gaze.

BACKGROUND

Applications executing on a computer can provide graphical user interfaces in application windows for interacting with the applications. A single application window may have "focus" at any point such that input that is provided by the user is received by the application window that has focus and not by other application windows. A user, however, may intend to provide input to a different application window than the one that has focus.

BRIEF SUMMARY

Apparatuses, methods, systems, and program products are disclosed for controlling input focus based on eye gaze. An apparatus, in one embodiment, includes a processor and a memory that stores code executable by the processor. In certain embodiments, the code is executable by the processor to determine a location of a user's eye gaze on the display device. In some embodiments, the code is executable by the processor to determine an application window presented on the display device that corresponds to the determined location of the user's eye gaze. In various embodiments, the code is executable by the processor to ignore input in response to the determined application window that corresponds to the location of the user's eye gaze not having focus.

A method for controlling input focus based on eye gaze, in one embodiment, includes determining, by a processor, a location of a user's eye gaze on a display device. The method, in one embodiment, includes determining an application window presented on the display device that corresponds to the determined location of the user's eye gaze. In further embodiments, the method includes ignoring input in response to the determined application window that corresponds to the location of the user's eye gaze not having focus.

A computer program product for controlling input focus based on eye gaze, in one embodiment, includes a computer readable storage medium having program instructions embodied therewith. In certain embodiments, the program instructions are executable by a processor to cause the processor to determine a location of a user's eye gaze on a display device. In further embodiments, the program instructions are executable by a processor to cause the processor to determine an application window presented on the display device that corresponds to the determined location of the user's eye gaze. In one embodiment, the program instructions are executable by a processor to cause the processor to ignore input in response to the determined application window that corresponds to the location of the user's eye gaze not having focus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
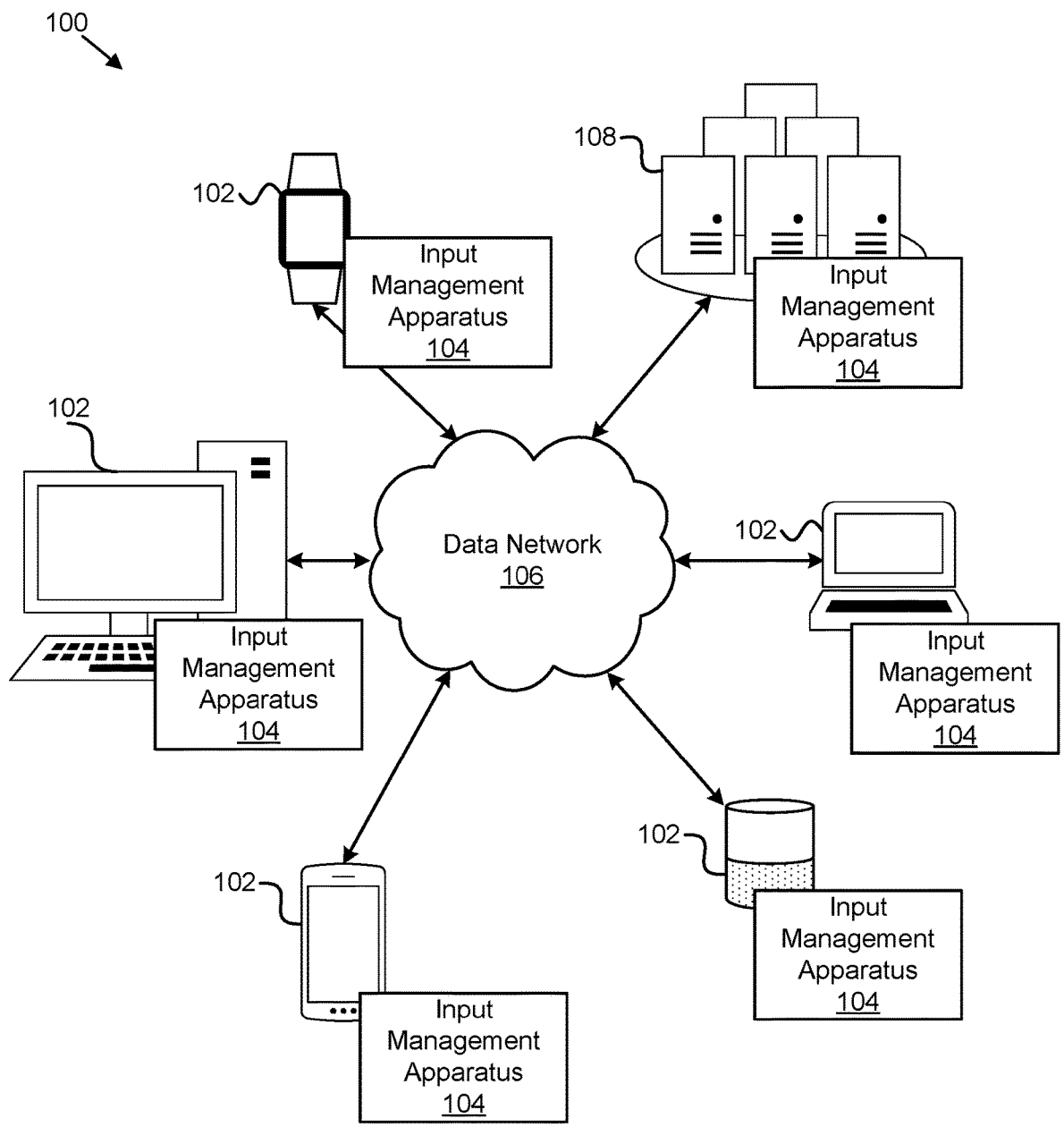
FIG. 1 is a schematic block diagram illustrating one embodiment of a system for controlling input focus based on eye gaze.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to determine a location of a user's eye gaze on the display device. In some embodiments, the code is executable by the processor to determine an application window presented on the display device that corresponds to the determined location of the user's eye gaze. In various embodiments, the code is executable by the processor to ignore input in response to the determined application window that corresponds to the location of the user's eye gaze not having focus.

In one embodiment, the code is executable by the processor to constantly track the user's eye gaze while the user is looking at the display device. In certain embodiments, the code is executable by the processor to provide feedback that indicates that the determined application window that corresponds to the determined location of the user's eye gaze does not have focus in response to receiving the input.

In one embodiment, the feedback is selected from the group consisting of visual feedback, audible feedback, and haptic feedback. In certain embodiments, the visual feedback is selected from the group consisting of displaying a pop-up window, flickering the application window, and darkening the display around the application window that has focus.

In some embodiments, the code is executable by the processor to disable an input device in response to determining that the determined application window that corresponds to the determined location of the user's eye gaze does not have focus. In one embodiment, the code is executable by the processor to receive the input in response to one or more of detecting that the user provided the input a threshold number of times and the user pressed a shift key to provide the input.

In further embodiments, ignoring the input comprises determining that the input is input that closes an application window that has focus and preventing the application window that has focus from receiving the input. In various embodiments, the input is ignored in response to determining that an application window that has focus is in a state for receiving input.

In one embodiment, the code is executable by the processor to buffer the input that is received while the user's eye gaze is located within the application window that does not have focus and provide the buffered input to the application window that does not have focus in response to the application window gaining focus. In certain embodiments, the code is executable by the processor to determine a position of a cursor on the display and ignore the input in response to the location of the user's eye gaze corresponding to the application window that does not have focus and the determined position of the cursor being at a location that corresponds to the application window that does not have focus.

In one embodiment, the code is executable by the processor to detect a pattern of context switching between the application window and a second application window and ignore the input in response to the pattern of context switching being broken and the location of the user's eye gaze corresponding to the application window that does not have focus. In some embodiments, the pattern of context switching is broken in response to determining that a time period for performing a subsequent context switch of the pattern exceeds a determined time threshold. The time threshold may be determined based on a time for performing each context switch of the pattern.

A method for controlling input focus based on eye gaze, in one embodiment, includes determining, by a processor, a location of a user's eye gaze on a display device. The method, in one embodiment, includes determining an application window presented on the display device that corresponds to the determined location of the user's eye gaze. In further embodiments, the method includes ignoring input in response to the determined application window that corresponds to the location of the user's eye gaze not having focus.

In one embodiment, the method includes providing feedback that indicates that the determined application window that corresponds to the determined location of the user's eye gaze does not have focus in response to receiving the input. In further embodiments, the feedback is selected from the group consisting of visual feedback, audible feedback, and haptic feedback. In some embodiments, the visual feedback is selected from the group consisting of displaying a pop-up window, flickering the application window, and darkening the display around the application window that has focus.

In one embodiment, the method includes disabling an input device in response to determining that the determined application window that corresponds to the determined location of the user's eye gaze does not have focus. In further embodiments, the method includes buffering the input that is received while the user's eye gaze is located within the application window that does not have focus and providing the buffered input to the application window that does not have focus in response to the application window gaining focus.

A computer program product for controlling input focus based on eye gaze, in one embodiment, includes a computer readable storage medium having program instructions embodied therewith. In certain embodiments, the program instructions are executable by a processor to cause the processor to determine a location of a user's eye gaze on a display device. In further embodiments, the program instructions are executable by a processor to cause the processor to determine an application window presented on the display device that corresponds to the determined location of the user's eye gaze. In one embodiment, the program instructions are executable by a processor to cause the processor to ignore input in response to the determined application window that corresponds to the location of the user's eye gaze not having focus.

FIG. 1 is a schematic block diagram illustrating one embodiment of a system 100 for controlling input focus based on eye gaze. In one embodiment, the system 100 includes one or more information handling devices 102, one or more input management apparatuses 104, one or more data networks 106, and one or more servers 108. In certain embodiments, even though a specific number of information handling devices 102, input management apparatuses 104, data networks 106, and servers 108 are depicted in FIG. 1, one of skill in the art will recognize, in light of this disclosure, that any number of information handling devices 102, input management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the information handling devices 102 include or are communicatively coupled to a display device such as a monitor or multiple monitors, a touch display, a television, a projector, and/or the like. In further embodiments, the information handling devices 102 include or are communicatively coupled to a camera, or other image capture device, that can be used to track the user's eye gaze, e.g., a direction in which a user is looking relative to the camera and the display.

In one embodiment, the input management apparatus 104 is configured to determine a location of a user's eye gaze on a display device, determine an application window presented on the display device that corresponds to the determined location of the user's eye gaze, and ignore input in response to the determined application window that corresponds to the location of the user's eye gaze not having focus. In this manner, the application window that has focus, but that the user is not looking at, will not inadvertently receive input (e.g., keyboard key presses, and/or the like) that is likely intended for the application window that the user is looking at. The input management apparatus 104, including its various sub-modules, may be located on one or more information handling devices 102 in the system 100, one or more servers 108, one or more network devices, and/or the like. The input management apparatus 104 is described in more detail below with reference to FIGS. 2 and 3.

In various embodiments, the input management apparatus 104 may be embodied as a hardware appliance that can be installed or deployed on an information handling device 102, on a server 108, on a user's mobile device, on a display, or elsewhere on the data network 106. In certain embodiments, the input management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the input management apparatus 104 may include a power interface, a wired and/or wireless network interface, a graphical interface that attaches to a display, and/or a semiconductor integrated circuit device as described below, configured to perform the functions described herein with regard to the input management apparatus 104.

The input management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the input management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the input management apparatus 104.

The semiconductor integrated circuit device or other hardware appliance of the input management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the input management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
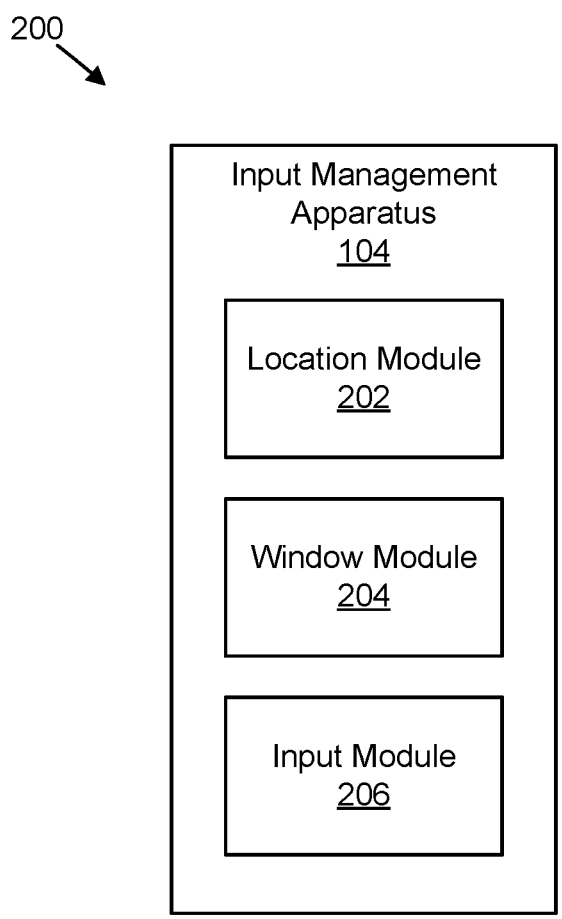
FIG. 2 is a schematic block diagram illustrating one embodiment of an apparatus for controlling input focus based on eye gaze.

FIG. 2 is a schematic block diagram illustrating one embodiment of an apparatus 200 for controlling input focus based on eye gaze. In one embodiment, the apparatus 200 includes an instance of an input management apparatus 104. In one embodiment, the input management apparatus 104 includes one or more of a location module 202, a window module 204, and an input module 206, which are described in more detail below.

In one embodiment, the location module 202 is configured to determine a location of a user's eye gaze on a display device. As used herein, a user's eye gaze may refer to a direction in which the user is looking. The user's eye gaze may be tracked to measure either the point of gaze, e.g., the location where a user is looking on a display device, or the motion of an eye relative to the head. The user's eye gaze may be tracked using an eye tracker, such as a camera or video camera, where images or videos of the user's eyes are processed to determine the user's eye position. Types of eye trackers may include cameras and video cameras, which may include infrared variants of cameras and video cameras.

The location of the user's eye gaze on a display may include a display coordinate, e.g., an x-y coordinate, a display identifier in the case of a multiple display system, and/or the like. For instance, the location module 202 may determine a display identifier for a display that the user is looking at and a location on the display where the user is looking such as a single coordinate for a pinpoint location on the display where the user is looking, a range of coordinates for an area on the display where the user is looking, or the like.

In one embodiment, the window module 204 is configured to determine an application window presented on the display device that corresponds to the determined location of the user's eye gaze. For instance, the window module 204 may use the display identifier and the coordinate(s) that describes the location of the user's eye gaze on the display and determine an application window that is viewable on the identified display at the determined coordinate(s). The window module 204 may determine an identifier, such as a graphical user interface identifier or another unique identifier for the application window that the user is looking at.

Furthermore, in certain embodiments, the window module 204 determines whether the application window that the user is looking at has "focus". As used herein, window focus may refer to the application window that is selected to receive input such as keyboard input, microphone input, or the like, from an input device. For example, text entered at a keyboard or pasted from a clipboard is sent to the application window that has focus. Typically, an application window loses focus when a different application window gains focus, e.g., when a user clicks on a different application window with a mouse pointer.

The window module 204 may query the operating system, e.g., Microsoft Windows®, a desktop environment manager, e.g., Gnome® or KDE®, and/or the like to determine an identifier for the application window that has focus, which can be compared to the application window that the user is looking at to determine whether the application window that has focus is the same window as the application window the user is looking at.

In one embodiment, the input module 206 is configured to ignore input in response to the determined application window that corresponds to the location of the user's eye gaze not having focus. As described above, the input may be keyboard input such as text or paste input, microphone input, and/or the like. Ignoring input may include discarding received input, preventing input that is received at a bus from being further processed, buffering input (described below), disabling input devices (described below), and/or the like. In this manner, if the user provides input that is intended for the application window that does not have focus, it will not inadvertently be entered into or received by the application window that does have focus.

For example, a user may be drafting an email in an email program on one display and receive an instant message that pops up on the user's other display. Without switching focus to the instant message popup, the user may begin to type a response to the received instant message. Normally, the typed response would be entered into the application window for the email program because it has window focus, which would not be the user's intended action. However, the input management module 104 may detect that the user is not looking at the application window that has focus for the email program and will therefore ignore the typed response. Furthermore, as described in more detail below, the user's attention may be drawn to the application window that does have focus so that the user understands why the entered input is being ignored.

In one embodiment, the input module 206 ignores the input in response to determining that an application window that has focus is in a state for receiving input. For example, if a spreadsheet application window has focus and a cursor is ready to receive input within a cell of the spreadsheet and the user is looking at a different application window that does not have focus while typing on the keyboard, the input module 206 may ignore the input until the user is looking at the spreadsheet application.

In certain embodiments, the input module 206 allows or receives the input that is intended for the application window that does not have focus in response to the user entering the input a threshold number of times, e.g., pressing the Enter key five times, and/or in response to the user pressing a shift of function key while entering the input. In this manner, the input module 206 temporarily switches focus to the application window that the user is looking at so that the application window can receive the input, and then switch the focus back to the application window that originally had window focus (e.g., by pressing the Enter key five times or by releasing the shift/function key).

In one embodiment, the input module 206 ignores input in response to the user's eye gaze not being located within the boundaries of the application window that has focus and in response to a second indicator. For example, the second indicator may be that the mouse pointer is located within the boundaries of the application window that the user is looking at (e.g., the window that does not have focus), that the mouse pointer is located outside the boundaries of the application window that has focus, that the user's head is directed to the application window that does not have focus, and/or the like.

Figure 3:
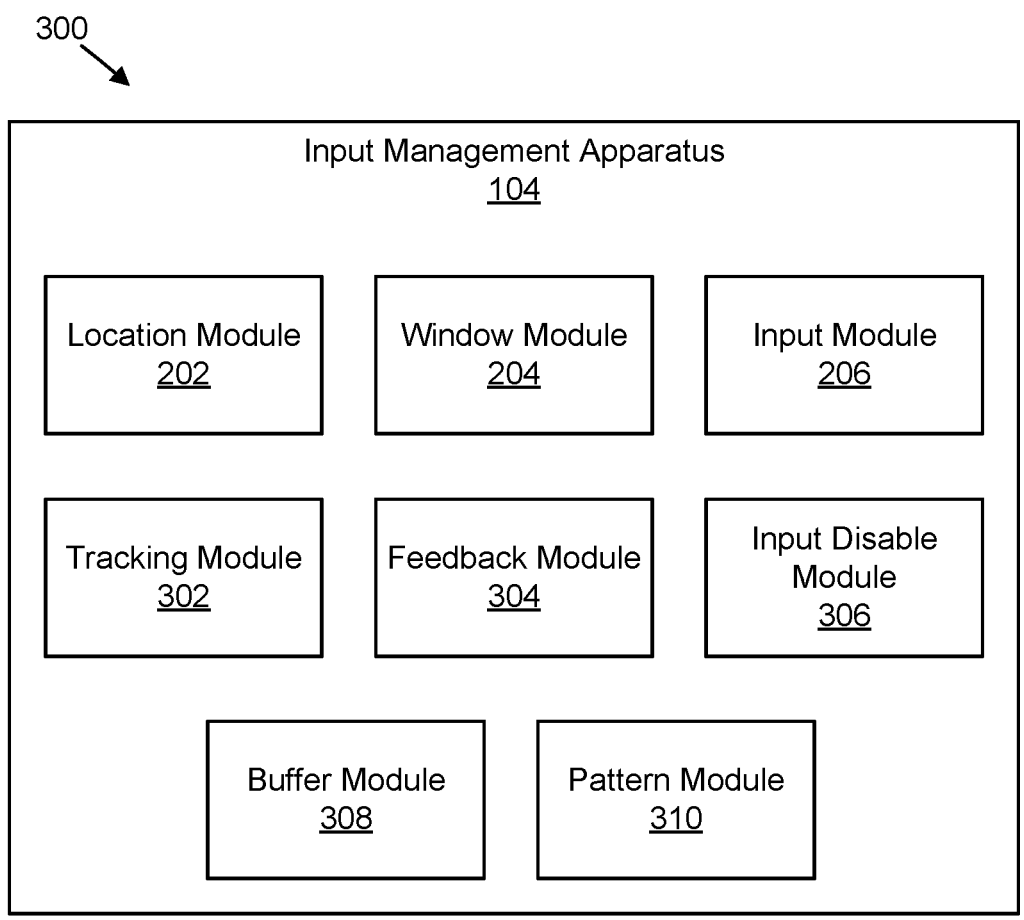
FIG. 3 is a schematic block diagram illustrating one embodiment of another apparatus for controlling input focus based on eye gaze.

FIG. 3 is a schematic block diagram illustrating one embodiment of another apparatus 300 for controlling input focus based on eye gaze. In one embodiment, the apparatus 300 includes an instance of an input management apparatus 104. The input management apparatus 104, in certain embodiments, includes a location module 202, a window module 204, and an input module 206, which may be substantially similar to the location module 202, the window module 204, and the input module 206 described above with reference to FIG. 2. The input management module 104, in further embodiments, includes one or more of a tracking module 302, a feedback module 304, an input disable module 306, a buffer module 308, and a pattern module 310, which are described in more detail below.

In one embodiment, the tracking module 302 is configured to track the user's eye gaze while the user is looking at the display device. The tracking module 302, for instance, may initially detect the user's eyes and the direction that the user is looking using input received by an eye tracking device, e.g., images/video captured by a camera, and may continually, periodically, or the like capture images/video of the user's eyes while the user is detected to be located in front of a display, or multiple displays. The tracking module 302 may further determine and/or update the location information where the user is looking, such as the display identifier and the application window identifier that corresponds to the display location, e.g., coordinates on the display where the user is looking. In this manner, the user's eye gaze location and the application window that corresponds to the user's eye gaze location can be dynamically determined in real-time to prevent sluggish or slow behavior.

In one embodiment, the feedback module 304 is configured to provide feedback that indicates that the determined application window that corresponds to the determined location of the user's eye gaze does not have focus in response to receiving the input. The feedback, in certain embodiments, includes visual feedback, audible feedback, and haptic feedback. For instance, if the user is looking at an application window that does not have focus and starts typing on a keyboard, the feedback module 304 may cause the keyboard (or mouse, chair, smart phone, headphones, or the like) to vibrate or shake and/or the feedback module 304 may generate an alarm, beep, or other sound that is emitted by a speaker or headphones.

In some embodiments, visual feedback that the feedback module 304 generates may include displaying a pop-up window, flickering the application window that has focus (making it brighter and darker), darkening the display around the application window that has focus, displaying a graphical arrow or other indicator in the direction of the user's gaze that points to the application window that has focus, and/or the like.

In one embodiment, the input disable module 306 is configured to disable an input device in response to determining that the determined application window that corresponds to the determined location of the user's eye gaze does not have focus. The input disable module 306, for instance, may disable a keyboard, e.g., disable a communication port that the keyboard is coupled to, so that input from the keyboard is not received until the user's eye gaze is directed to the application window that has focus. At which point, the input disable module 306 may reenable the input device, e.g., reenable the port that the keyboard is coupled to.

In one embodiment, the input disable module 306 disables certain keys, buttons, functions, and/or the like, e.g., disables certain keys, of an input device in response to determining that the input is input that closes an application window that has focus. For example, the input disable module 306 may disable an Escape key, or other key, that dismisses, closes, exits, or the like the application window that has focus, while the user is looking at a different application window, the input module 206 ignores the input by preventing the application window that has focus from receiving the input. In such an embodiment, the input module 206 may allow other types of input to be received, even though the user is not looking at the application window that has focus, unless the input is of a type that would close or exit the application window.

In one embodiment, the buffer module 308 is configured to buffer the input that is received while the user's eye gaze is located within the application window that does not have focus. For example, if the user starts typing a response to an instant message in an application window that does not have focus while a word processing application window has focus, instead of ignoring the typed input so that it is not entered into the word processing application, the buffer module 308 may buffer the input, e.g., in a storage buffer. Accordingly, if the user switches focus from the word processing application window to the instant message window so that the instant message window gains focus, the buffered input may be provided, entered, input, or the like in the instant message window.

In certain embodiments, the buffer module 308 provides buffered input to the application window that does not have focus, but that the user is looking at, in response to the user switching focus from the application window with focus to the application window that the user was looking at without providing input in between the window focus switch besides input that is used to switch the focus of the application windows.

In one embodiment, the pattern module 310 is configured to detect a pattern of context switching between an application window that does not have focus and a second application window that has focus. The pattern of context switching, for example, may include multiple copy and paste operations from one application window to the other. In one embodiment, the input module 310 may ignore the input, e.g., the pasted content, in response to the pattern of context switching being broken and the location of the user's eye gaze corresponding to the application window that does not have focus.

In one embodiment, the pattern module 310 determines that the pattern of context switching is broken in response to determining that a time period for performing a subsequent context switch of the pattern exceeds a determined time threshold. For instance, if the time threshold is two seconds (e.g., a copy operation starts the time and provides two seconds for performing a subsequent paste operation), and the user takes longer than two seconds to perform the paste operation, the feedback module 304 may provide feedback to indicate that the paste operation is ignored. In some embodiments, the time threshold is determined based on a time for performing each context switch of the pattern, e.g., based on recorded or average times for performing previous context switch operations/actions (copy/paste actions).

Figure 4:
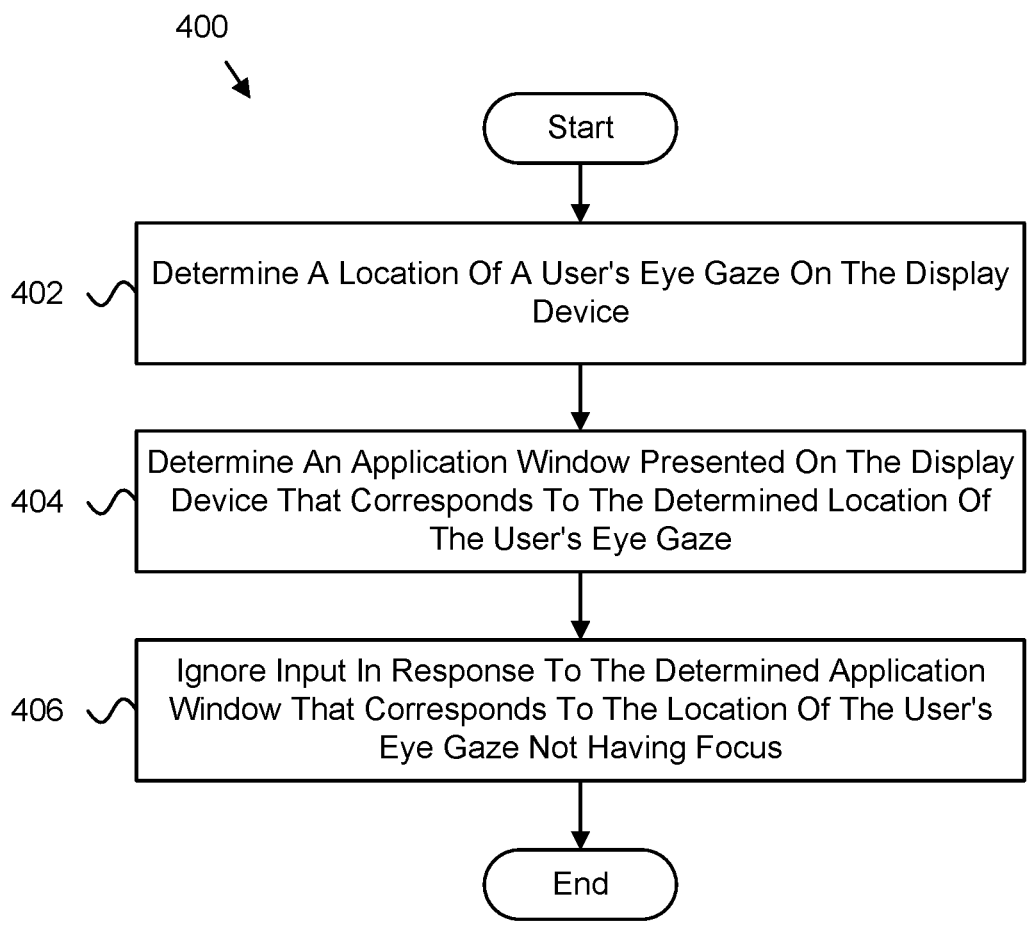
FIG. 4 is a schematic flow chart diagram illustrating one embodiment of a method for controlling input focus based on eye gaze.

FIG. 4 is a schematic flow chart diagram illustrating one embodiment of a method 400 for controlling input focus based on eye gaze. In one embodiment, the method 400 begins and determines 402 a location of a user's eye gaze on the display device. In further embodiments, the method 400 determines 404 an application window presented on the display device that corresponds to the determined location of the user's eye gaze.

In certain embodiments, the method 400 ignores 406 input in response to the determined application window that corresponds to the location of the user's eye gaze not having focus, and the method 400 ends. In one embodiment, the location module 202, the window module 204, and the input module 206 perform the various steps of the method 400.

Figure 5:
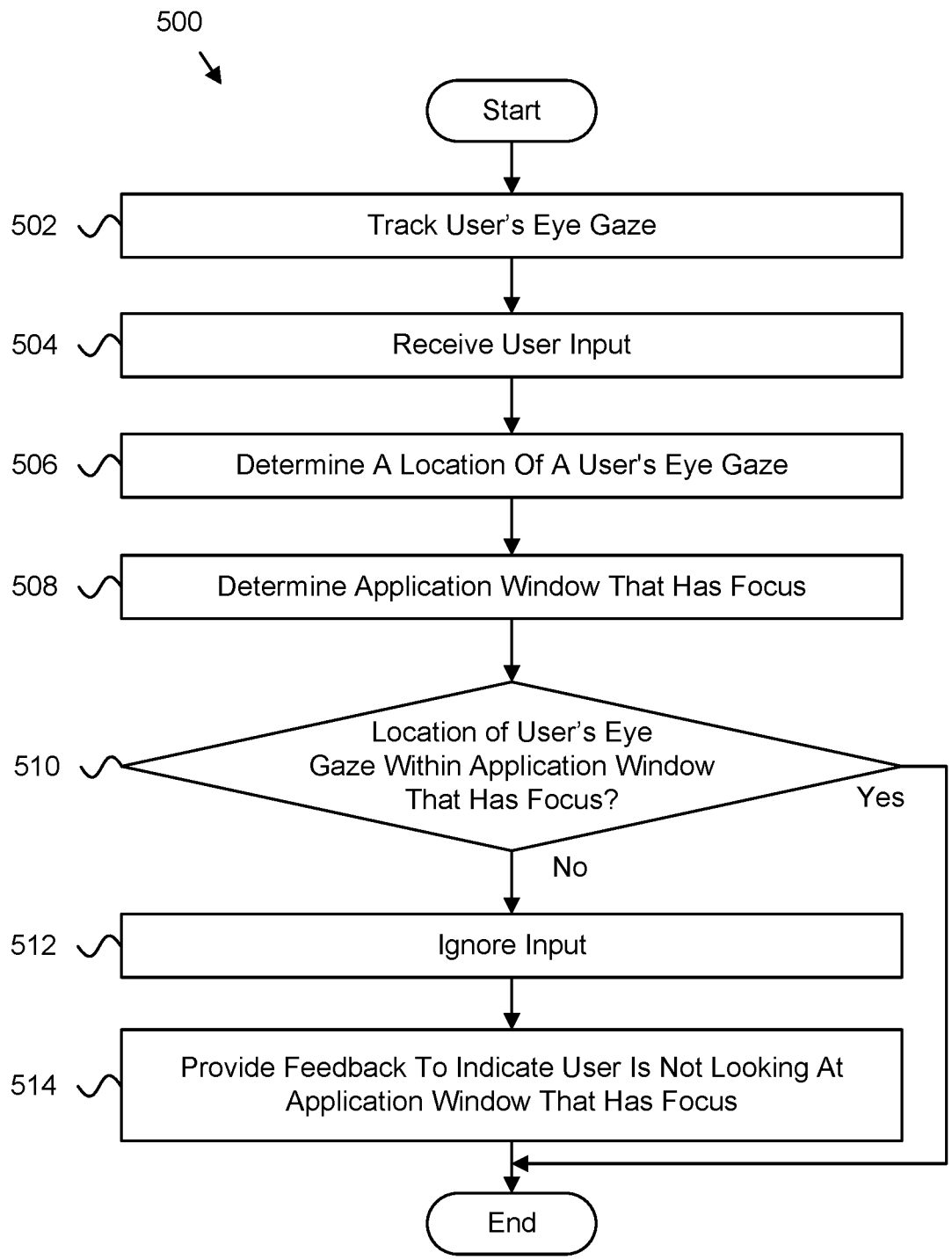
FIG. 5 is a schematic flow chart diagram illustrating one embodiment of another method for controlling input focus based on eye gaze.

FIG. 5 is a schematic flow chart diagram illustrating one embodiment of another method 500 for controlling input focus based on eye gaze. In one embodiment, the method 500 begins and tracks 502 the user's eye gaze while the user is looking at a display device. In further embodiments, the method 500 receives 504 input from a user, e.g., keyboard input.

In one embodiment, in response to the input, the method 500 determines 506 a location of a user's eye gaze on the display device. In some embodiments, the method 500 determines 508 an application window presented on the display device that corresponds to the determined location of the user's eye gaze. In certain embodiments, the method 500 determines 510 whether the user's eye gaze is located within the boundaries of an application window that has focus. If so, then the method 500 ends.

Otherwise, the method 500 ignores 512 the received input in response to the determined application window that corresponds to the location of the user's eye gaze not having focus. The method 500, in further embodiments, provides 514 feedback that indicates that the application window that corresponds to the determined location of the user's eye gaze does not have focus, and the method 500 ends. In one embodiment, the location module 202, the window module 204, the input module 206, the tracking module 302, and the feedback module 304 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a processor; and
    a memory that stores code executable by the processor to:
        determine a location of a user's eye gaze on a single display device, the single display device presenting a plurality of application windows within the single display device;
        determine a first application window of the plurality of application windows presented on the single display device that corresponds to the determined location of the user's eye gaze, the first application window having window focus for receiving input;
        detect that the user's eye gaze is directed to a second application window of the plurality of application windows presented on the single display device, the second application window not having window focus;
        receive input while the user's eye gaze is directed to the second application window and the first application window still has window focus; and
        ignore the received input such that it is not received by the first application window while the user's eye gaze is directed to the second application window.

2. The apparatus of claim 1, wherein the code is executable by the processor to constantly track the user's eye gaze while the user is looking at the single display device.

3. The apparatus of claim 1, wherein the code is executable by the processor to provide feedback that indicates that the determined application window that corresponds to the determined location of the user's eye gaze does not have focus in response to receiving the input.

4. The apparatus of claim 3, wherein the feedback is selected from the group consisting of visual feedback, audible feedback, and haptic feedback.

5. The apparatus of claim 4, wherein the visual feedback is selected from the group consisting of displaying a pop-up window, flickering the application window, and darkening the display around the application window that has focus.

6. The apparatus of claim 1, wherein the code is executable by the processor to disable an input device in response to determining that the determined application window that corresponds to the determined location of the user's eye gaze does not have focus.

7. The apparatus of claim 1, wherein the code is executable by the processor to receive the input in response to one or more of detecting that the user provided the input a threshold number of times and the user pressed a shift key to provide the input.

8. The apparatus of claim 1, wherein ignoring the input comprises:
    determining that the input is input that closes an application window that has focus; and
    preventing the application window that has focus from receiving the input.

9. The apparatus of claim 1, wherein the input is ignored in response to determining that an application window that has focus is in a state for receiving input.

10. The apparatus of claim 1, wherein the code is executable by the processor to:
    buffer the input that is received while the user's eye gaze is located within the application window that does not have focus; and
    provide the buffered input to the application window that does not have focus in response to the application window gaining focus.

11. The apparatus of claim 1, wherein the code is executable by the processor to:
    determine a position of a cursor on the single display device; and
    ignore the input in response to the location of the user's eye gaze corresponding to the application window that does not have focus and the determined position of the cursor being at a location that corresponds to the application window that does not have focus.

12. The apparatus of claim 1, wherein the code is executable by the processor to:

detect a pattern of context switching between the application window and a second application window; and ignore the input in response to the pattern of context switching being broken and the location of the user's eye gaze corresponding to the application window that does not have focus.

13. The apparatus of claim 12, wherein the pattern of context switching is broken in response to determining that a time period for performing a subsequent context switch of the pattern exceeds a determined time threshold, the time threshold determined based on a time for performing each context switch of the pattern.

14. A method, comprising:
determining, by a processor, a location of a user's eye gaze on a single display device, the single display device presenting a plurality of application windows within the single display device;
determining a first application window of the plurality of application windows presented on the single display device that corresponds to the determined location of the user's eye gaze, the first application window having window focus for receiving input;
detecting that the user's eye gaze is directed to a second application window of the plurality of application windows presented on the single display device, the second application window not having window focus;
receiving input while the user's eye gaze is directed to the second application window and the first application window still has window focus; and
ignoring the received input such that it is not received by the first application window while the user's eye gaze is directed to the second application window.

15. The method of claim 14, further comprising providing feedback that indicates that the determined application window that corresponds to the determined location of the user's eye gaze does not have focus in response to receiving the input.

16. The method of claim 15, wherein the feedback is selected from the group consisting of visual feedback, audible feedback, and haptic feedback.

17. The method of claim 16, wherein the visual feedback is selected from the group consisting of displaying a pop-up window, flickering the application window, and darkening the display around the application window that has focus.

18. The method of claim 14, further comprising disabling an input device in response to determining that the determined application window that corresponds to the determined location of the user's eye gaze does not have focus.

19. The method of claim 14, further comprising:
buffering the input that is received while the user's eye gaze is located within the application window that does not have focus; and
providing the buffered input to the application window that does not have focus in response to the application window gaining focus.

20. A computer program product, comprising a non-transitory computer readable storage medium having program instructions embodied therewith, the program instructions executable by a processor to cause the processor to:
determine a location of a user's eye gaze on a single display device, the single display device presenting a plurality of application windows within the single display device;
determine a first application window of the plurality of application windows presented on the single display device that corresponds to the determined location of the user's eye gaze, the first application window having window focus for receiving input;
detect that the user's eye gaze is directed to a second application window of the plurality of application windows presented on the single display device, the second application window not having window focus;
receive input while the user's eye gaze is directed to the second application window and the first application window still has window focus; and
ignore the received input such that it is not received by the first application window while the user's eye gaze is directed to the second application window.

* * * * *